United States Patent
Mahamkali et al.

(10) Patent No.: US 11,184,823 B1
(45) Date of Patent: Nov. 23, 2021

(54) ARTIFICIAL INTELLIGENCE (AI) MANAGEMENT OF ROAMING SERVICE PROVIDER AGREEMENTS FOR OFFLOADING VOICE CALLS FROM CELLULAR NETWORKS TO WI-FI HOTSPOTS

(71) Applicant: Fortinet, Inc., Sunnyvale, CA (US)

(72) Inventors: Ravikiran Mahamkali, Bangalore (IN); Sujith Sudhi, Bangalore (IN)

(73) Assignee: Fortinet, Inc., Sunnyvale, CA (US)

( * ) Notice: Subject to any disclaimer, the term of this patent is extended or adjusted under 35 U.S.C. 154(b) by 9 days.

(21) Appl. No.: 16/915,960

(22) Filed: Jun. 29, 2020

(51) Int. Cl.
*H04W 36/14* (2009.01)
*H04W 88/10* (2009.01)
*H04W 36/00* (2009.01)
*H04W 48/14* (2009.01)
*H04W 84/12* (2009.01)

(52) U.S. Cl.
CPC ....... *H04W 36/14* (2013.01); *H04W 36/0066* (2013.01); *H04W 48/14* (2013.01); *H04W 88/10* (2013.01); *H04W 84/12* (2013.01)

(58) Field of Classification Search
CPC . H04W 36/14; H04W 36/0066; H04W 48/14; H04W 88/10; H04W 84/12
See application file for complete search history.

(56) References Cited

U.S. PATENT DOCUMENTS

2013/0070739 A1* 3/2013 McCann ............... H04W 48/16
370/338

OTHER PUBLICATIONS

Commscope, Hotspot 2.0—Release 2: Accelerating the move to automatic and secure roaming when using Wi-Fi technology, Jan. 2020. Retrieved from https://www.commscope.com/globalassets/digizuite/1527-wp-hotspot-2-0.pdf. (Year: 2020).*

* cited by examiner

*Primary Examiner* — Erica Navar
(74) *Attorney, Agent, or Firm* — Law Office of Dorian Cartwright; Dorian Cartwright (57) ABSTRACT

Requests for roaming service agreements intended for an ANQP server to initiate offloading an ongoing voice call from a cellular network associated with a SP for the station to the Wi-Fi network are received. A connection is made if the SP matches a list of SP providers for which the AP has a roaming service agreement. Responsive to not matching the list of SP providers, the SP miss and location data of the station is stored. Statistics concerning stored AP misses and identifying a threshold being met for a particular SP are generated. AI identifies SP updates needed from statistics concerning SP misses for the particular SP for which no roaming service agreement has been established with the AP.

8 Claims, 8 Drawing Sheets

| Octets | Element ID | Length | Access Network Options | Venue Info (optional) | HESSID (optional) |
|---|---|---|---|---|---|
| | 1 | 1 | 1 | 0 or 2 | 0 or 6 |

FIG. 4A

| Octets | Element ID | Length | Number of ANQP Ols | OI #1 and #2 Lengths | OI #1 | OI #2 | OI #3 |
|---|---|---|---|---|---|---|---|
| | 1 | 1 | 1 | 1 | variable | variable | variable |

FIG. 4B

| Octets | Element ID | Length | Advertisement Protocol Tuple #1 | Advertisement Protocol Tuple #2 (optional) | ~ | Advertisement Protocol Tuple #n (optional) |
|---|---|---|---|---|---|---|
| | 1 | 1 | variable | variable | | variable |

ARTIFICIAL INTELLIGENCE (AI) MANAGEMENT OF ROAMING SERVICE PROVIDER AGREEMENTS FOR OFFLOADING VOICE CALLS FROM CELLULAR NETWORKS TO WI-FI HOTSPOTS

FIELD OF THE INVENTION

The invention relates generally to computer networking, and more specifically, to artificial intelligence (AI) management of roaming service provider agreements for offloading voice calls from cellular networks to Wi-Fi hot spots.

BACKGROUND

Smart phones can save battery power and cell service bandwidth by using data networks over cellular networks when appropriate. In more detail, smart phones can transparently switch from cellular networks to data networks while within range, and then seamlessly switch back to cellular networks or even another data network when no longer within range.

Recent technologies such as IEEE 802.11u (promulgated by the Institute of Electrical and Electronics Engineers) and Hot Spot 2.0 (also known as HS2 and Wi-Fi Certified Passpoint and promulgated by the Wi-Fi Alliance) make hot spot roaming easier by advertising more than just basic information to stations in the network discovery process. For example, IEEE 802.11u provides for beacons that advertise realms available for connection from a hot spot, allowing a station to determine compatibility to the realms.

Under IEEE 802.11u, the Access Network Query Protocol (ANQP) is a query and response protocol that defines services offered by an access point, such a wi-Fi hot spot. Generally, when a station queries an AP using ANQP, that user receives a list of items that describe the service available, without having to commit to a network. The ANQP provides information useful for a mobile device selecting a Wi-Fi network, including the AP operator domain name, the IP address available at the AP, and information about potential roaming partners accessible through the AP using 3G (third-generation mobile telephony) cellular networks available through the AP.

One problem with relying on Wi-Fi networks for offloading is the dynamic nature, and large number of independent administrators when considering an overall, aggregate of Wi-Fi coverage for a particular service provider. For example, service providers cannot keep up with new Wi-Fi networks available, existing Wi-Fi networks being unavailable either temporarily or permanently, and the nature of service within a particular Wi-Fi network. Currently, service providers manually analyze for increase or reduction of coverage through service provider agreements. From the Wi-Fi network perspective, processing is easier with fewer available service provider agreements. In fact, IEEE 802.11u only provides for three realms.

What is needed is a robust technique to automatically and intelligently manage roaming service provider agreements based on local Wi-Fi statistics.

SUMMARY

To meet the above-described needs, methods, computer program products, and systems for automatically and intelligently managing roaming service provider agreements based on local Wi-Fi statistics.

In one embodiment, roaming agreement information for a plurality of service providers and a network location for a plurality of service provider servers available over the data communication network are stored. Beacon frames advertising Hot spot 2.0 capabilities of the AP for station connections over the Wi-Fi network are advertised.

In another embodiment a request for roaming service agreements intended for an ANQP server to initiate offloading an ongoing call from a cellular network associated with a SP for the station to the Wi-Fi network is received. A connection is made if the SP matches a list of SP providers for which the AP has a roaming service agreement. Responsive to not matching the list of SP providers, the SP miss and location data of the station is stored. Statistics concerning stored AP misses and identifying a threshold being met for a particular SP are generated.

In still another embodiment, AI identifies SP updates needed from statistics concerning SP misses for the particular SP for which no roaming service agreement has been established with the AP. AI can also identify updates needed to existing roaming agreements based on historical usage. Some implementations automatically implement updates.

Advantageously, data communication networks are automatically tuned for better Hot Spot operation. Furthermore, smart phone battery life is increased by roaming to data networks.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

Methods, computer program products, and systems for AI management of service provider agreements at local Wi-Fi networks.

A hot spot operated by a device (e.g., an access point or a smart phone) provides a WLAN connection for a mobile device within range for data roaming. Generally, the term realms is used generically herein to refer to NAI (Network Access Identifier) realms, OIs (Organization Identifier), OUIs (Organizationally Unique Identifier), ISPs (Internet Service Providers), SSP (Subscription Service Providers), and other network service providers configured to provide roaming data services through not spots. The techniques ease hot spot connections for roaming stations and others. For example, a smartphone can automatically roam to a hot spot for offloading data from a cellular network. Although the hot spot allows the connection without a fee to the user, based on the amount of data usage, the hot spot can charge the cellular network for the offloading. Although the description refers to Wi-Fi, other types of wireless communication networks, such as Bluetooth, can be substituted along with other substitutions, as would be recognized by one of ordinary skill in the art.

I. AI Systems for Managing Service Provider Agreements (FIGS. 1-5)

Figure 1A:
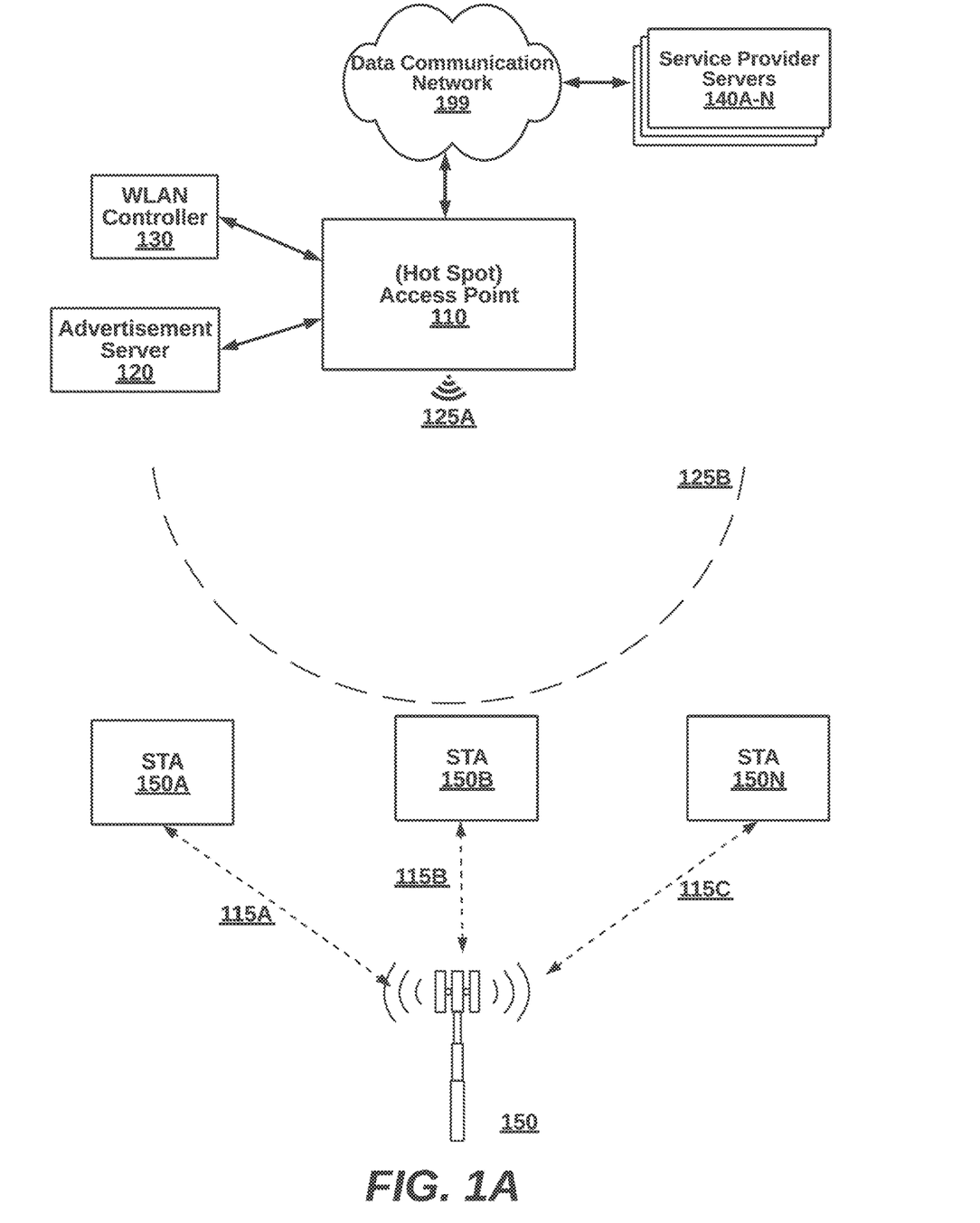
FIGS. 1A-1B are high-level block diagrams illustrating an example off cellular network offloading in an AI system for managing service provider agreements at local Wi-Fi networks, according to one embodiment.

FIG. 1A is a high-level block diagram illustrating an AI system for managing service provider agreements at local Wi-Fi networks, according to one embodiment. The system 100 comprises a (hot spot) access point 110, an advertisement server 120, a WLAN controller 130, service providers 140A-N, and (roaming) stations 150A-N. The components can be coupled to a network 199, such as the Internet, a local network or a cellular network, through any suitable wired (e.g., Ethernet) or wireless (e.g., Wi-Fi or 4G) medium, or hybrid combination of network types. In a preferred embodiment, the access point 110 is coupled to the stations 150A-N through wireless communication channels 115A-N. Additionally, the access point 110 is coupled to back-end components such as the advertisement server 120, the WLAN controller 130, or the like, through wired communication channels, and is coupled to stations 150A-N through wireless communication channels, such as Wi-Fi.

Other embodiments of communication channels for system 100 are possible. Additional network components can also be part of the system 100, such as additional controllers (e.g., an SDN, or software-defined networking, controller), additional access points, firewalls, virus scanners, routers, switches, application servers, databases, and the like. Numerous hot spots can overlap in coverage areas, operating jointly or autonomously. Moreover, an enterprise can also operate hot spots at different locations under centralized information servers.

The access point 110 collects statistics for roaming connection attempts from stations, as well as statistics for usage characteristics during a roaming connection. The roaming connection attempts are detected during the ANQP query response phase. One high-level statistic can be hits and misses, as stations have success of failure in finding an appropriate SP. As a result, the access point 110 can provide localized information about stations looking for a particular SP for which the hot spot does not have a roaming agreement. A more detailed statistic classifies the hits and misses by device type, OS type, channel selection, and service request, for example.

Figure 1B:
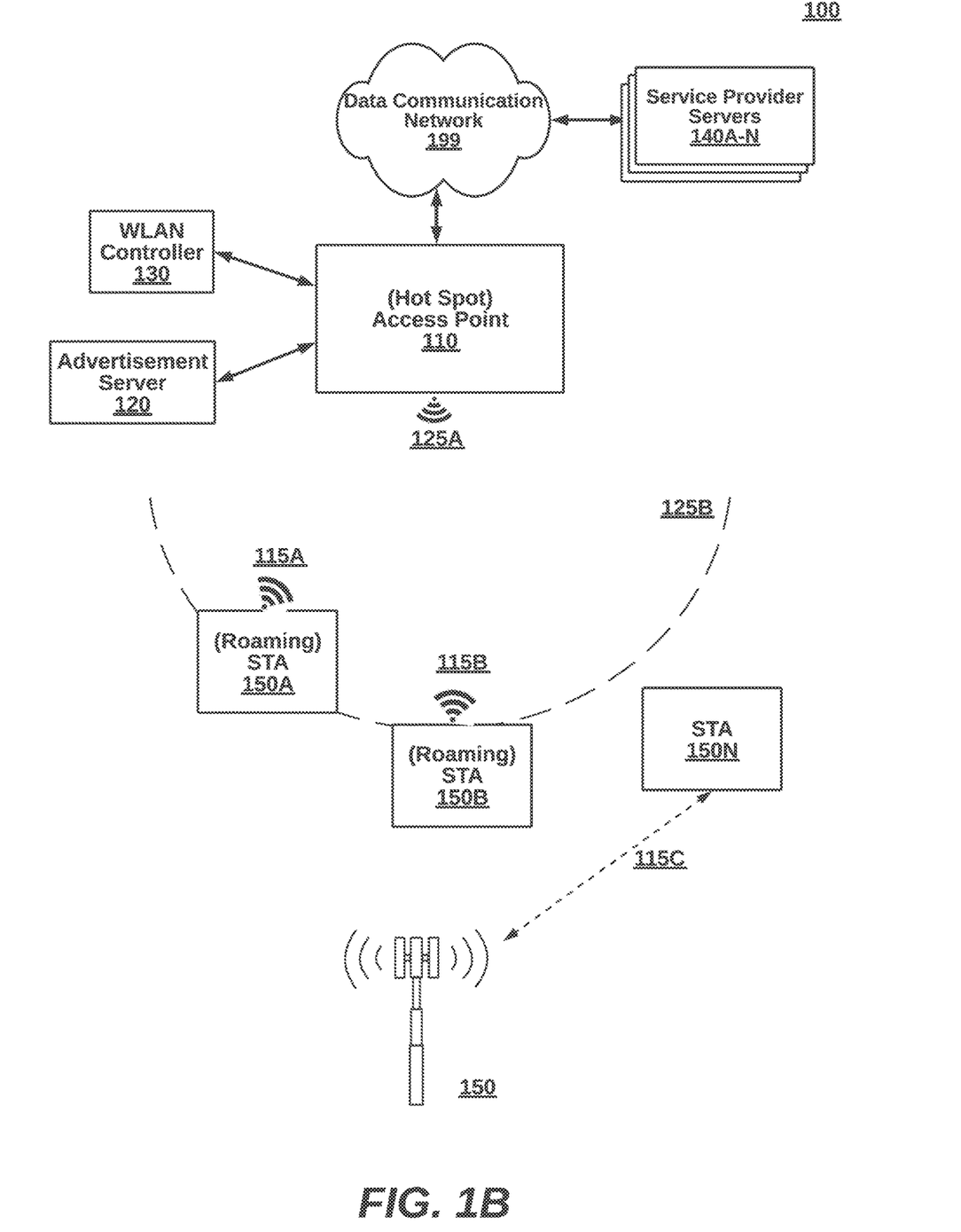

A successful connection offloads stations from cellular networks to the data communication network 199 for continuing voice calls and other activities. Initially, in FIG. 1A, STAs 150A and 150B connected to cellular towner 150 via 3G channels 115A and 115B. As the STAs 150A and 150B move into range 125B, Wi-Fi connections 115A and 115B are established with access point 110 to save battery life, as shown in FIG. 1B. Later, STAs 115A and 115B can move to a different location at which time a cellular network connection with cellular tower 150 is resumed. The STAs 115A and 115B can also switch to a different Wi-Fi to continue traversing data networks.

The connection characteristics collected by the access point 110 during roaming can lead to adjustments that improve these connections. Example connection statistics include the number of stations offloading service for each SP, connectivity issues per SP, applications used by the stations per SP, and device fingerprints per operator or SP. In one embodiment, various dashboard reports are generated for transmission to the SPs. Additionally, for optimizing the Wi-Fi itself, the reports show the hot spot venue operator comparisons of SPs for offloading to the WLAN so that better roaming agreements can be negotiated. One instance of the access point 110 uses machine learning to identify roaming agreement optimizations and automatically negotiates with an SP administrator or with AI on the SP servers 140A-N to adjust the roaming agreement. In another instance, when a threshold number of stations from Airtel, and SP, AI in response can automatically allocate a separate cannel for Airtel. In still another instance, if few stations are using an application causing a negative impact on connectivity and traffic for other users, AI can identify the problem from statistics and appropriate DPI policies can be applied.

In one embodiment, stations are seamlessly roaming from one Wi-Fi to another, rather than offloading from a cellular network. Also, stations can choose to move from one Wi-Fi to another Wi-Fi with better rates or better service. Roaming brokers, such as iPass, GRIC, and Boingo can have roaming agreements in place and automatically optimized by the access point 110.

More generally, the connection process for the access point 110 begins with broadcasted beacons from transceiver 125A that include an NAI realm list identifying all SPs or realms available through the BSS (Basic Service Set). The beacons can be formatted according to IEEE 802.11u, Hot spot 2.0, subsequent updates, or alternative protocols. The beacons can reach as far as range 125B for the access point 110. SP realms for roaming consortiums can be identified by an OI (organization identifier) which is a 24-bit strings assigned by IEEE. Other realms can be identified by an OIU which is a globally-unique 36-bit string, identifying a manufacturer, operator, or other organization. In some embodiments, additional realms can be provided upon request from stations 150A-N. In some cases, the requests to the access point 110 for additional realms can be offloaded to the advertisement server 120 to prevent disruption of access point services. The access point 110 broadcasts beacons advertising one or more BSSIDs (Basic Service Set Identifiers) in accordance with IEEE 802.11 or other protocols to allow connections by the stations 150A-N that are able to authenticate with the preferred realms of the access point 110. In one example, a BSSID is a 48-bit field of the same format as an IEEE 802 MAC address that uniquely identifies a BSS (Blind Service Set). The access point 110 can authenticate a selected realm of the preferred realms suing IEEE 802.1x or other authentication paradigms. Once the stations 150A-N establish a connection by associating and authenticating, data services to the network 199 are made available by the access point 110 on behalf of one or the service providers 140A-N.

In another embodiment, a NAI home realm query can be received from the stations 150A-N that are actively discovering supported realms. The NAI home realm query includes NAI realms for which it has authentication credentials. More generally, an NAI is a standard under RFC 4282 for identifying users requesting access to the network. The NAI realm identifies the proper authentication server or domain for the user's authentication exchange. Optionally, the NAI realm can also indicate the EAP (Extensible Authentication Protocol) types supported by each realm as well as authentication parameters for that EAP type. Once connected, the access point 110 uses IEEE 802.1x to authenticate the station with a realm and begins forwarding packets concerning the stations 110A-N. In some cases, the service providers 140 are charged based on an amount of network usage by associated stations.

Figure 7:
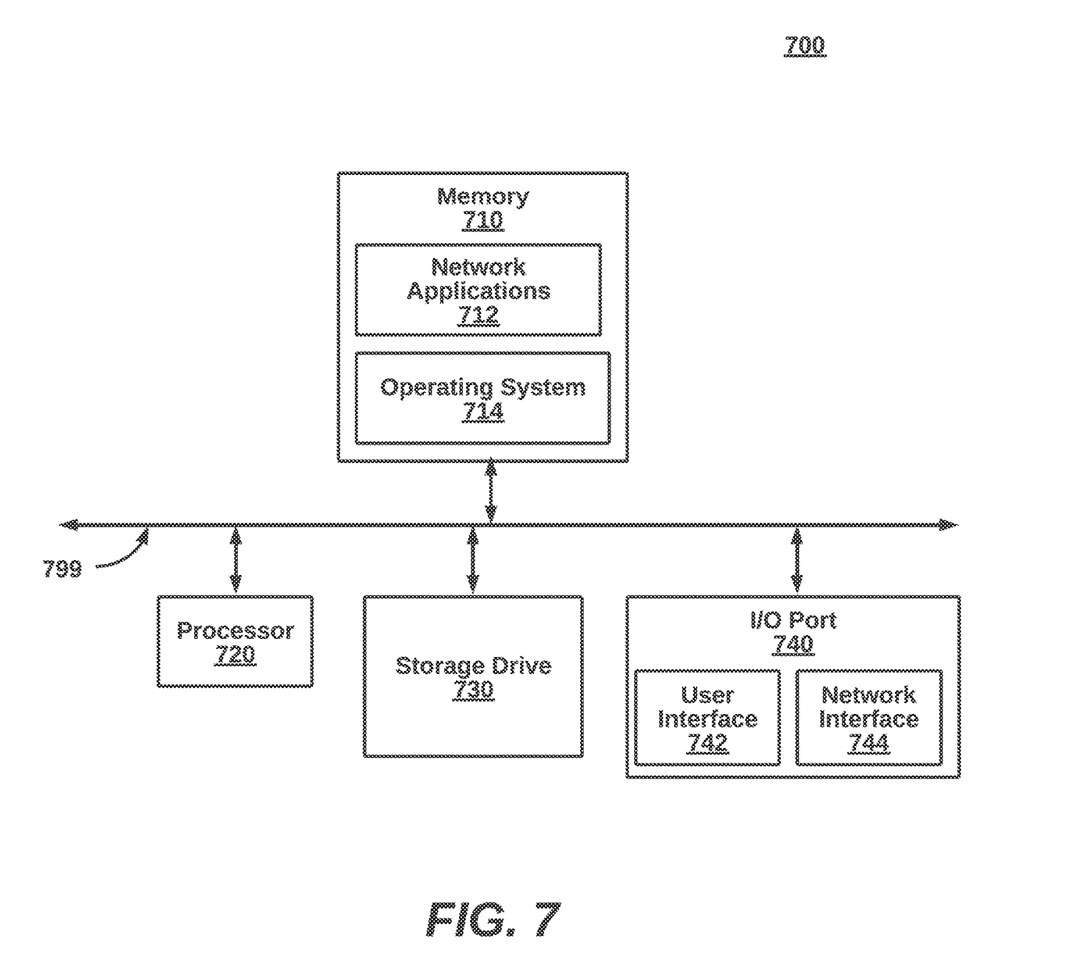
FIG. 7 is a block diagram illustrating an exemplary computing device, according to one embodiment.

The access point 110 can be implemented as a server blade, a PC, a laptop, a smartphone with tethering services, any appropriate processor-driven device, or any of the computing devices discussed herein (e.g., see FIG. 7). Besides access points, other roaming partners include MSOs, MNOs, wireline operators, public venues, enterprises, and any other appropriate entity with Wi-Fi assets. The access point 110 can be specifically configured for hot spot roaming or be generically configured. For example, the access point 110 can be an AP 110 or AP 433 (modified as discussed herein) by Meru Networks of Sunnyvale, Calif. A network administrator can strategically place multiple access points for optimal coverage area over a locale. The access point 110 can, in turn, be connected to a wired hub, switch or router connected to the network 199. In another embodiment, the functionality is incorporated into a switch or router. In some embodiments, a controller (not shown) provides management and offloading services to a group of access points over a LAN in a single locale or through cloud-services for geographically distributed or independent access points. More detailed embodiments of the access point 110 are discussed below in association with FIG. 2.

The WLAN controller 130 can also implement AI for realm management exclusively or in coordination with access point managed by the WLAN controller 130. Because the WLAN controller 130 is hierarchically above access points, activities at other access points within an enterprise network can be leveraged as stations move to connections with different access points within the same enterprise network.

The stations 150A-N detect various hot spots as a user moves to different locations. At this point, the stations 150A-N are in a network discovery mode because the stations 150A-N are unauthenticated and unassociated with respect to the access point 110. Beacons from the access point 110 and potentially other available access points are detected, along with available SP realms in one case. Also, a request is sent to available access points to receive additional available realms, besides those in another case. ANQP request response interactions can occur prior to a completed connection. More specifically, a Public Action frame provided by IEEE 802.11u enables the stations 150A-N to prompt the access point 110 for more information before an association for obtaining an IP address is formed. For example, GAS (Generic Advertisement Service) frames with ANQP (Access Network Query Protocol) requests can be utilized the stations 150A-N to discover supported realms beyond the those advertised (see e.g., FIGS. 4B an 4C). Once a list of preferred realms is sent to the stations 150A-N from the access point 110, a realm can be automatically selected or manually input by a user. Authentication credentials provided by IEEE 802.1x or some other mechanism are forwarded from the stations 150A-N to the access point 110 to begin normal Wi-Fi use.

The stations 150A-N can be implemented as a personal computer, a laptop computer, a tablet computer, a smart phone, a mobile computing device, a server, a cloud-based device, a virtual device, an Internet appliance, or any of the computing devices described herein (see e.g., FIG. 7). The stations 150A-N can be specifically configured for hot spot roaming (e.g., with authentication credentials or with a mobile application) or be generically configured (e.g., with operating system integration). No special client is needed for techniques described herein, although other aspects of the network may require downloads to the stations 150A-N. The stations 150A-N connect to the access point 110 for access to a LAN or external networks using an RF (radio frequency) antenna and network software complying with, for example, IEEE 802.11.

Figure 2:
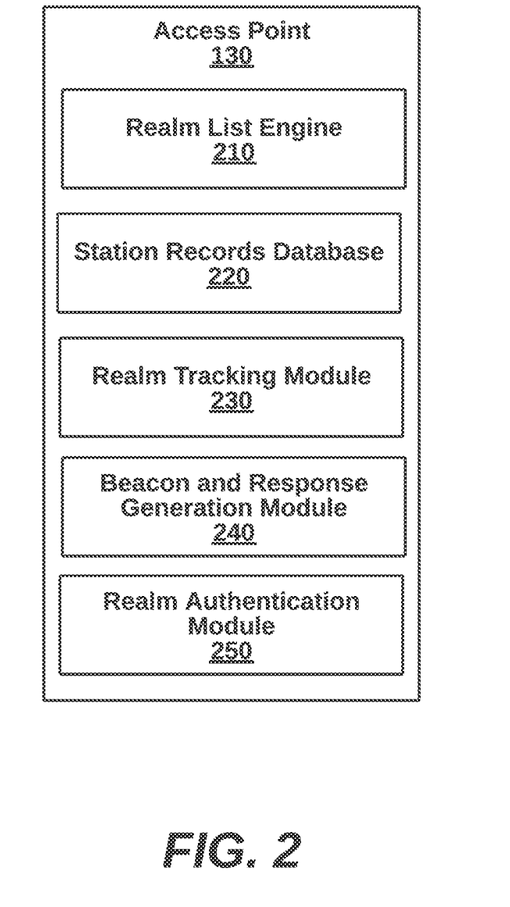
FIG. 2 is a more detailed block diagram illustrating an AP (access point) of the system of FIG. 1, according to one embodiment.

FIG. 2 is a more detailed block diagram illustrating an access point 110 of the system 100, according to one embodiment. The access point 110 comprises a service provider (or realm) roaming agreements module 210, a STA connection module 220, an AI module 230, and a realm authentication module 240. The components can be implemented in hardware, software, or a combination of both. The access point 100 can include various other components for conventional operation, such as transceivers, network protocol modules, network policy modules, and the like.

The service provider roaming agreements module 210 stores roaming agreement data for a group of service providers. In some implementation, too many service providers can reduce efficiency, and too few service providers can miss revenue. The AI described herein, optimizes configurations of service providers based on historical usage. The historical data can be used as training data for machine learning to predict or respond to future network usage scenarios.

The STA connection module 220 manages connections with different types of stations, some offloading voice calls, other connecting for a different purpose. The STA connection module 220 can advertise hot spot services by broadcasting beacons, and then responding to stations that request the services. When ANQP query response occurs for offloading calls, the STA connection module 220 manages the process of connecting and authenticating. The STA connection module 220 can also handle transfers back to the cellular network by communicating with a specific service provider server.

The AI module 230 uses machine learning to update roaming agreements based on connection attempt statistics for stations.

The realm authentication module 240 communicates with service provider servers 140A-N along with other network security policies.

Figure 3:
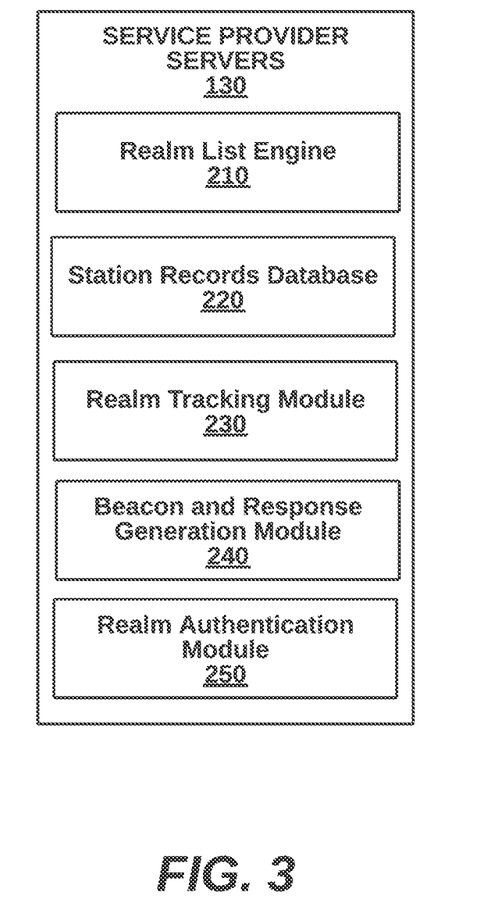
FIG. 3 is a more detailed block diagram illustrating a service provider of the system of FIG. 1, according to one embodiment.

FIG. 3 is a more detailed block diagram illustrating the service provider server 110 of the system 100, according to one embodiment. The service provider server 110 comprises a service provider (or realm) roaming agreements module 310, a 3G module 320, a hot spots module 330, a call tracking & offloading module 340, and a realm authentication module 350. The components can be implemented in hardware, software, or a combination of both. The access point 100 can include various other components for conventional operation, such as transceivers, network protocol modules, network policy modules, and the like.

In operation, the service provider roaming agreements module 310 is similar and compatible with the service provider roaming agreements module 210 of the access point 110. Service agreements are maintained with various hot spot providers. Updates to service agreements can based on local AI at hot spot providers. In one implementation, the service provider implements and controls AI at the local hot spots to collect training data for machine learning. In another implementation, AI process therein can renegotiate and automatically implement updates to the agreements. Statistics an be weaned from hot spots and from stations using the hot spots for offloading. The 3G module 320 handles configurations, authentications and other needs of stations connecting to a cellular network, while the hot spots module 330 handles the same for stations connecting to a data network. The call tracking & offloading module 340 maintains continuity and transparency by managing the voice call across data and cellular networks. The realm authentication module 350 implements network security policies for allowing connections.

Figure 4A:
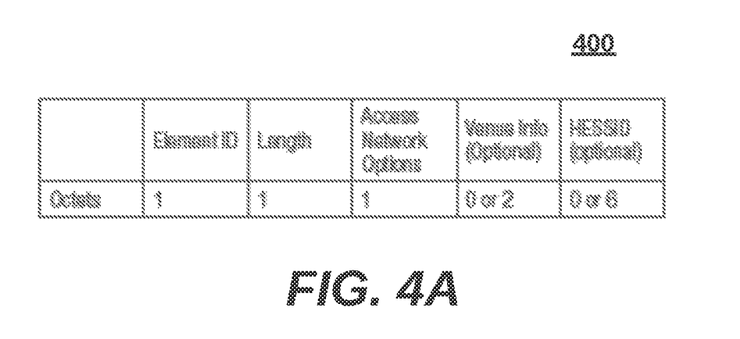
FIG. 4A-4C are block diagrams illustrating an Interworking element, a Roaming Consortium element 410 included beacons and probe responses, and Advertisement Protocol element included in beacons and probe responses, according to some embodiments.

FIG. 4A shows an Interworking element 400 included in beacons and probe responses. Inclusion of the Interworking element 400 indicates IEEE 802.11u compatibility. Within the Internetworking element 400, a network type element can indicate a network type as private, private with guest access, chargeable or free. An Internet field can be set to 1 if Wi-Fi network provides internet access. An ASRA (additional authentication step required) field and Emergency Service Accessible field can also be included. In response, a station can request a list of reams from an access point.

Figure 4B:
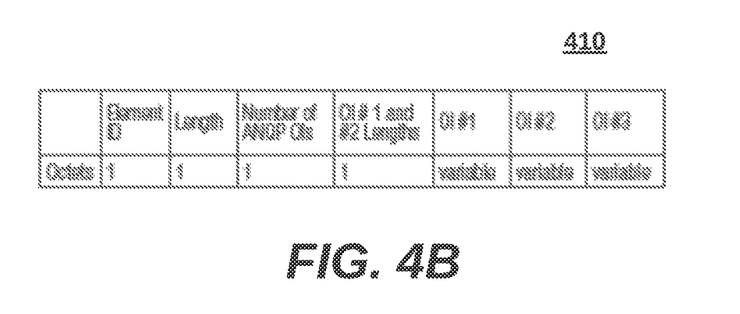
Figure 4C:
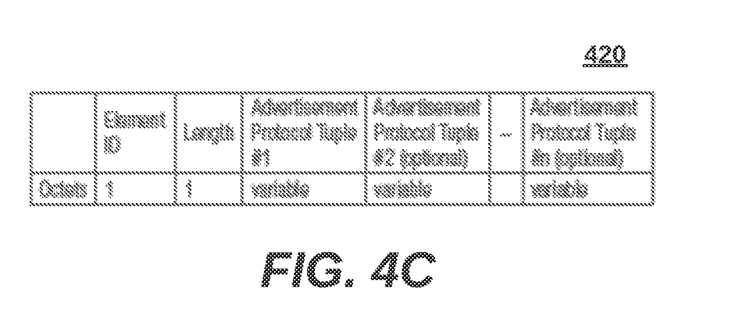

FIG. 4B shows a Roaming Consortium element 410 included beacons and probe responses. The Roaming Consortium element 420 indicates to stations which service providers are available to an access point at a hot spot. In return, stations can quickly scan to determine if there are any Wi-Fi networks for which it has valid security credentials. A number of ANQP OIs provides number of additional OIs (or OUIs) which are available upon request to an access point, and can be provided upon request by stations to an access point. The OI fields provide the three default service providers, in some cases. Stations unsatisfied with the three default OIs can request additional access points from an access point.

FIG. 4C shows an Advertisement Protocol element 420 included in beacons and probe responses. By scanning Advertisement Protocol Tuple fields of the Advertisement Protocol element 420, a station can determine the protocol necessary to query an access point for additional information. In particular, support for ANQP protocol is verified.

In some embodiments, the elements 400, 410, 420 are transmitted together within a single frame, and in other embodiments, are transmitted over more than one frame. One of ordinary skill in the art will recognize that alternative protocols formats, later versions of IEEE 802.11u formats, and proprietary frame formats, are all contemplated within the scope of the present disclosure.

II. Methods for AI Management of Service Provider Agreements (FIGS. 5-6)

Figure 5:
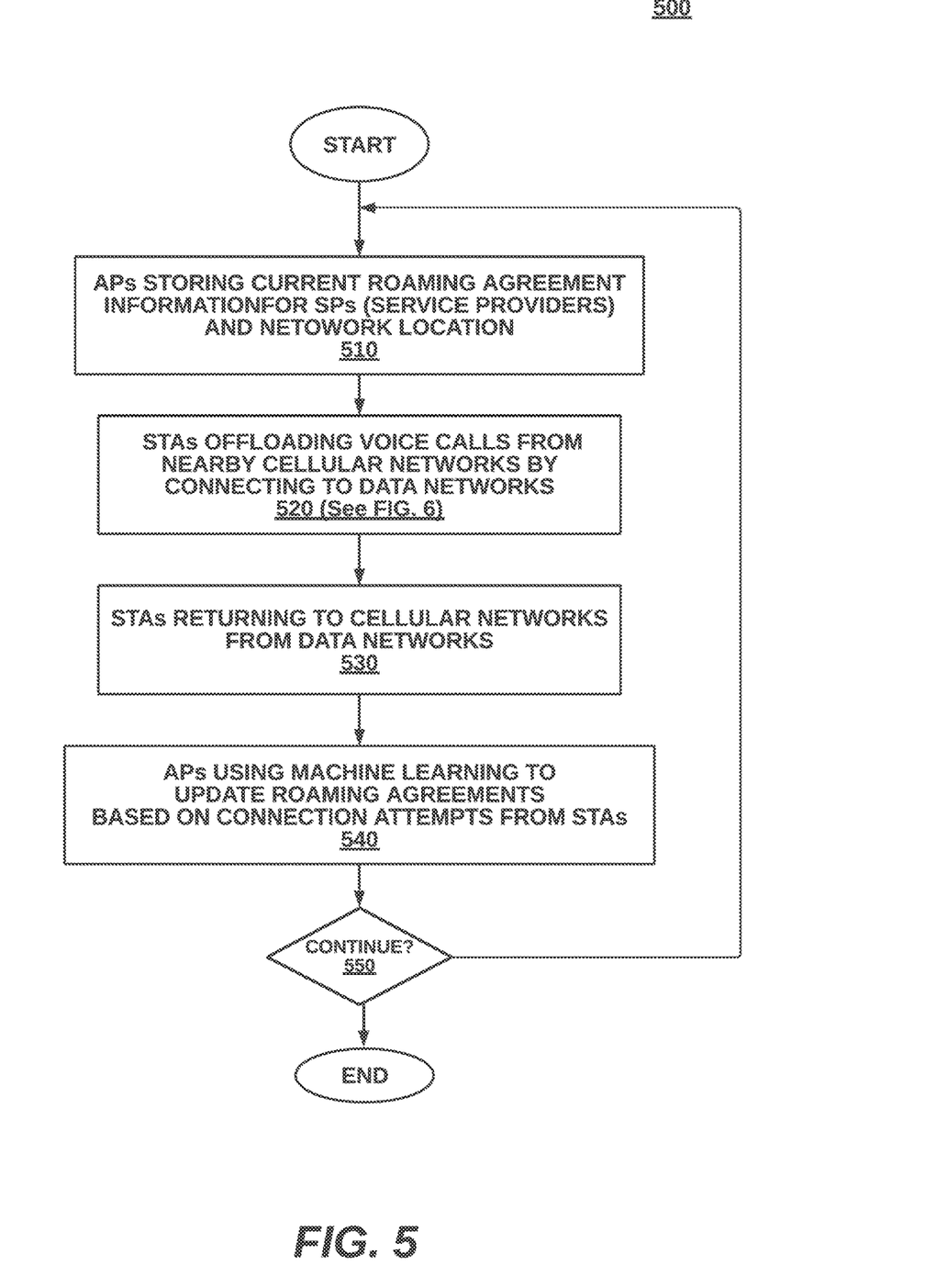
FIG. 5 is a high-level flow diagram illustrating a method for AI management of service provider agreements at local Wi-Fi networks, according to one embodiment.

FIG. 5 is a high-level flow diagram illustrating a method for AI management of service provider agreements at local Wi-Fi networks, according to one embodiment. The method 500 can be implemented, for example, in the access point 110 and/or the WLAN controller 130 of FIG. 1.

APs or other components store current roaming agreement information for service providers (step 510). Storage can be of any appropriate form, such as a table, spreadsheet, database, or remote server. STAs offload voice calls from nearby cellular networks by connecting to data networks, such as Hot Spot 2.0 enable Wi-Fi networks (step 520), as described in more detail below. In one example, a smart phone offloads due to low battery life, or due to coming within range of a hot spot that is part of a roaming network. STAs can return to cellular networks from data networks (step 530). This can be responsive to leaving a Wi-Fi range, to a better connection becoming available, user policies, applications being used, and other reasons. APs use machine learning to update roaming agreements based on connection attempts from STAs (step 540).

Figure 6:
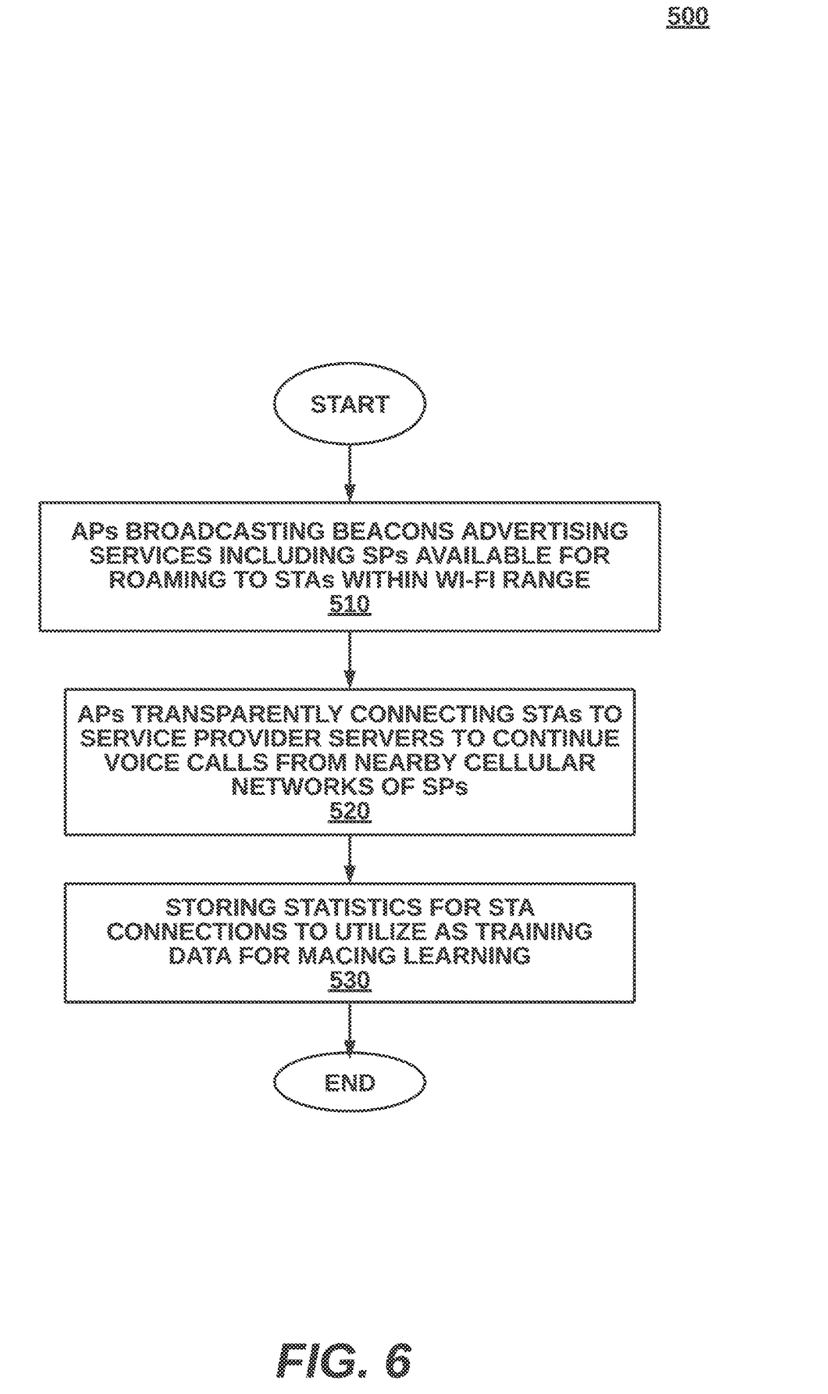
FIG. 6 is a more detailed flow diagram illustrating a step of offloading voice calls from nearby cellular networks by connecting to data networks, from in the method of FIG. 6, according to one embodiment.

FIG. 6 is a more detailed flow diagram illustrating the step 520 of offloading voice calls from nearby cellular networks by connecting to data networks, from in the method of FIG. 6, according to one embodiment.

APs broadcast beacons to STAs within range advertising services including service providers available for roaming (step 610). APs transparently connect STAs to service provider servers to continue voice calls from nearby cellular networks for the same SP (step 620). In the present embodiment, statistics from STA connections are stored for use as training data for machine learning (step 630).

Generic Computing Device (FIG. 7)

FIG. 7 is a block diagram illustrating an exemplary computing device 700 for use in the system 100 of FIG. 1, according to one embodiment. The computing device 700 is an exemplary device that is implementable for each of the components of the system 100, including the access point 110, the STAs 150A, 150B and 150N, the WLAN controller 130, and other components. Additionally, the computing device 700 is merely an example implementation itself, since the system 100 can also be fully or partially implemented with laptop computers, tablet computers, smart cell phones, Internet appliances, and the like.

The computing device 700, of the present embodiment, includes a memory 710, a processor 720, a hard drive 730, and an I/O port 740. Each of the components is coupled for electronic communication via a bus 750. Communication can be digital and/or analog, and use any suitable protocol.

The memory 710 further comprises network applications 712 and an operating system 714. The network applications 720 can include the modules of network applications, access points, or service provider servers, as illustrated in FIGS. 2 and 3. Other network applications can include 712 a web browser, a mobile application, an application that uses networking, a remote application executing locally, a network protocol application, a network management application, a network routing application, or the like.

The operating system 714 can be one of the Microsoft Windows® family of operating systems (e.g., Windows 98, 98, Me, Windows NT, Windows 2000, Windows XP, Windows XP x84 Edition, Windows Vista, Windows CE, Windows Mobile, Windows 7 or Windows 8), Linux, HP-UX, UNIX, Sun OS, Solaris, Mac OS X, Alpha OS, AIX, IRIX32, or IRIX84. Other operating systems may be used. Microsoft Windows is a trademark of Microsoft Corporation.

The processor 720 can be a network processor (e.g., optimized for IEEE 802.11), a general purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 720 can be single core, multiple core, or include more than one processing elements. The processor 720 can be disposed on silicon or any other suitable material. The processor 720 can receive and execute instructions and data stored in the memory 710 or the hard drive 830.

The storage device 730 can be any non-volatile type of storage such as a magnetic disc, EEPROM, Flash, or the like. The storage device 730 stores code and data for applications.

The I/O port 740 further comprises a user interface 742 and a network interface 744. The user interface 842 can output to a display device and receive input from, for example, a keyboard. The network interface 744 connects to a medium such as Ethernet or Wi-Fi for data input and output. In one embodiment, the network interface 744 includes IEEE 802.11 antennae.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

We claim:

1. A computer-implemented method in an access point (AP) of a data communication network, at least partially implemented in hardware and coupled to a wireless network, for determining service provider (SP) needs in a Wi-Fi network off-loading cellular calls, the method comprising:
    storing roaming agreement information for a plurality of service providers and a network location for a plurality of service provider servers available over the data communication network;
    broadcasting, with a network communication interface of the AP, beacon frames advertising Hot spot Hotspot 2.0 capabilities of the AP for station connections over the Wi-Fi network; receiving, from a station of a plurality of stations on the Wi-Fi network, a request for roaming service agreements intended for an Access Network Query Protocol (ANQP), server to initiate offloading an ongoing call from a cellular network associated with a SP for the station to the Wi-Fi network;
    determining, with a processor of the AP, whether the SP matches a list of SP providers for which the AP has a roaming service agreement; responsive to not matching the list of SP providers, storing the SP miss and location data of the station;
    generating, with the processor, statistics concerning stored AP misses and identifying a threshold being met for a particular SP; and
    transmitting, with the network communication interface, statistics concerning SP misses for the particular SP for which no roaming service agreement has been established with the AP.

2. The method of claim 1, further comprising: detecting an SP hit, wherein the memory stores SP hits.

3. The method of claim 2, further comprising: identifying connection parameters, wherein the memory stores the connection parameters for a connection in association with a particular SP.

4. The method of claim 1, further comprising: responsive to the station leaving Wi-Fi range of the access point, handing over the ongoing call back to the cellular network.

5. The method of claim 1, further comprising: responsive to the station leaving the Wi-Fi range of the access point, handing over the ongoing call to a second access point within managed by a WLAN controller, wherein the WLAN controller manages both the first and second access points.

6. The method of claim 1, further comprising responsive to the station leaving the Wi-Fi range of the access point, handing over the ongoing call to a third access point not associated with a Wi-Fi network of the first access point.

7. A non-transitory computer-readable medium storing instructions that, when executed by a processor, perform a computer-implemented method in an access point (AP) of a data communication network and coupled to a wireless network, for determining service provider (SP) needs in a Wi-Fi network off-loading cellular calls, the method comprising:
    storing roaming agreement information for a plurality of service providers and a network location for a plurality of service provider servers available over the data communication network; broadcasting, with a network communication interface of the AP, beacon frames advertising Hotspot Hot spot 2.0 capabilities of the AP for station connections over the Wi-Fi network;
    receiving, from a station of a plurality of stations on the Wi-Fi network, a request for roaming service agreements intended for an Access Network Query Protocol (ANQP), server to initiate offloading an ongoing call from a cellular network associated with a SP for the station to the Wi-Fi network;
    determining, with a processor of the AP, whether the SP matches a list of SP providers for which the AP has a roaming service agreement;
    responsive to not matching the list of SP providers, storing the SP miss and location data of the station;
    generating, with the processor, statistics concerning stored AP misses and identifying a threshold being met for a particular SP; and transmitting, with the network communication interface, statistics concerning SP misses for the particular SP for which no roaming service agreement has been established with the AP.

8. A system, at least partially implemented in hardware, comprising an access point (AP) communicatively coupled to a data communication network, to determine service provider (SP) needs in a Wi-Fi network off-loading cellular calls, the access point comprising:
- a memory to store roaming agreement information for a plurality of service providers and a network location for a plurality of service provider servers available over the data communication network;
- a network communication interface to broadcast beacon frames advertising Hotspot Hot spot 2.0 capabilities of the AP for station connections over the Wi-Fi network, wherein the network communication interface to receive, from a station of a plurality of stations on the Wi-Fi network, a request for roaming service agreements intended for an Access Network Query Protocol (ANQP), server to initiate offloading an ongoing call from a cellular network associated with a SP for the station to the Wi-Fi network;
- a processor to determine whether the SP matches a list of SP providers for which the AP has a roaming service agreement, wherein the memory stores, responsive to not matching the list of SP providers, the SP miss and location data of the station;
- generating, with the processor, statistics concerning stored AP misses and identifying a threshold being met for a particular SP; and
- transmitting, with the network communication interface, statistics concerning SP misses for the particular SP for which no roaming service agreement has been established with the AP.

* * * * *